(12) United States Patent
Leboeuf et al.

(10) Patent No.: US 7,305,118 B2
(45) Date of Patent: Dec. 4, 2007

(54) ILLUMINATION SYSTEM FOR MEASUREMENT SYSTEM

(75) Inventors: Pierre Leboeuf, Richelieu (CA); Nicolas Gauthier, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 644 days.

(21) Appl. No.: 10/969,935

(22) Filed: Oct. 22, 2004

(65) Prior Publication Data

US 2006/0087662 A1    Apr. 27, 2006

(51) Int. Cl.
   *G06K 9/00*    (2006.01)
(52) U.S. Cl. ...................... 382/152; 382/286
(58) Field of Classification Search ........ 382/141, 382/143, 152; 415/115, 160, 164, 211.1
   See application file for complete search history.

(56) References Cited

U.S. PATENT DOCUMENTS

| | | | |
|---|---|---|---|
| 4,222,172 A | 9/1980 | Mason | |
| 4,582,426 A | 4/1986 | Douglas | |
| 4,875,777 A | 10/1989 | Harding | |
| 4,896,430 A * | 1/1990 | Burton | 33/552 |
| 4,983,043 A | 1/1991 | Harding | |
| 5,291,270 A * | 3/1994 | Koch et al. | 356/602 |
| 5,307,150 A * | 4/1994 | Lecerf et al. | 356/601 |
| 5,517,310 A | 5/1996 | Paquette | |
| 5,620,301 A * | 4/1997 | Lawer | 415/150 |
| 5,630,701 A * | 5/1997 | Lawer | 415/160 |
| 5,931,636 A * | 8/1999 | Savage et al. | 415/115 |
| 6,094,269 A | 7/2000 | Ben-Dove et al. | |
| 6,148,677 A | 11/2000 | Evangelista | |
| 6,730,927 B1 * | 5/2004 | Smith et al. | 250/573 |
| 2003/0228069 A1 * | 12/2003 | Leboeuf | 382/286 |
| 2004/0239948 A1 | 12/2004 | Harding et al. | |

FOREIGN PATENT DOCUMENTS

| | | |
|---|---|---|
| CA | 2389484 | 12/2003 |
| CA | 2487844 | 12/2003 |
| CA | 2467124 | 11/2004 |
| JP | 61176806 | 8/1986 |
| JP | 62182604 | 8/1987 |
| JP | 05087534 | 4/1993 |

OTHER PUBLICATIONS

U.S. Appl. No. 10/969,941, Leboeuf et al.

* cited by examiner

*Primary Examiner*—Vikkram Bali
(74) *Attorney, Agent, or Firm*—Ogilvy Renault LLP

(57) ABSTRACT

An improved method and device for reflectively measuring a subject such as a throat area in a vane ring for a gas turbine engine uses improved lighting arrangements to improve the quality of reflection to thereby reduce problems associated with poor quality reflection which may adversely affect the image processing and thus reduce the accuracy of measurement.

20 Claims, 7 Drawing Sheets

ILLUMINATION SYSTEM FOR MEASUREMENT SYSTEM

FIELD OF THE INVENTION

The invention relates to a method of measuring the throat area of a vane ring for a gas turbine engine by irradiating or illuminating the vanes and shrouds bounding a selected throat, then measuring the resulting shadow area.

BACKGROUND OF THE INVENTION

To calibrate the stator ring relative to the gas turbine engine, the flow area of the stator must be determined. Conventionally, the flow area of a stator ring can be determined by use of a flow rig in which the pressure drop as air passes through the stator ring is used to determine its effective flow area. Another conventional method of determining the flow area of the stator ring involves mechanically measuring the dimensions of the throat area. This approach is time consuming and improvements are available.

SUMMARY OF THE INVENTION

It is one object of the present invention to provide an improved vane flow measurement system.

In accordance with one aspect of the present invention, there is a provided A device for measuring a throat area in a vane ring for gas turbine engines, the vane ring having an annular array of vanes defining a plurality of individual throats between adjacent leading and following vanes of the array, the device comprising at least one primary lighting source adapted to radiate light onto a vane ring in a manner to provide an area of reflectance surrounding an area of primary shadow, the area of primary shadow substantially corresponding to an area of a selected throat to be measured, the at least one primary lighting source being positioned sufficiently close to the vane ring such that the at least one lighting source provides the area of reflectance substantially without secondary shadow, said secondary shadow being caused by interruption of light from the at least one primary source caused by a portion of the vane ring; a detector positioned for capturing data regarding said area of reflectance and said shadow; and a processor for analyzing the data to determine dimensional data regarding the area of the selected throat.

In accordance with another aspect of the present invention, there is a provided a device for measuring a throat area in a vane ring for gas turbine engines, the vane ring having an annular array of vanes defining a plurality of individual throats between adjacent leading and following vanes of the array, the device comprising a plurality of primary lighting sources adapted to radiate light onto a vane ring in a manner to provide an area of reflectance surrounding an area of primary shadow, the area of primary shadow substantially corresponding to an area of a selected throat to be measured, the plurality of primary lighting sources providing respective adjacent radiating zones of light without substantial overlap or gap between said adjacent zones; a detector positioned for capturing data regarding said areas of reflectance and shadow; and a processor for analyzing the data regarding said areas to determine dimensional data regarding the area of the selected throat.

In accordance with another aspect of the present invention, there is a provided a device for measuring a throat area in a vane ring for gas turbine engines, the vane ring having an annular array of vanes defining a plurality of individual throats between adjacent leading and following vanes of the array, the device comprising: a at least one primary lighting source adapted to radiate light onto a vane ring in a manner to provide an area of reflectance surrounding an area of primary shadow, the area of primary shadow substantially corresponding to an area of a selected throat to be measured, the at least one primary source being positioned and focused light beams to provide an effective virtual lighting source located between the primary lighting source and the selected throat; a detector positioned for capturing data regarding said areas of reflectance and shadow; and a processor for analyzing data to determine dimensional data regarding the area of the selected throat.

In accordance with another aspect of the present invention, there is a provided a device for measuring a throat area in a vane ring for gas turbine engines, the vane ring having an annular array of vanes defining a plurality of individual throats between adjacent leading and following vanes of the array, the device comprising at least one primary lighting source adapted to radiate light onto a vane ring in a manner to provide an area of reflectance surrounding an area of primary shadow, the area of primary shadow substantially corresponding to an area of a selected throat to be measured; a detector positioned for capturing data regarding of said areas of reflectance and shadow; a polarizing filter co-operating with the detector to filter said data; and a processor for analyzing the data to determine dimensional data regarding the area of the selected throat.

In accordance with another aspect of the present invention, there is a provided a method of measuring a throat area in a vane ring for gas turbine engines, the vane ring having an annular array of vanes defining a plurality of individual throats between adjacent leading and following vanes of the array, the method comprising directing light towards a selected throat of the vane ring to provide at least one area of reflectance and at least one area of primary shadow, said array, be proportional to an area of the selected throat; selectively varying the intensity of reflected light across the area of reflectance to permit more uniform reflectance data to be received from the area of reflectance; acquiring reflectance data from the area of reflectance; and analyzing the data to determine dimensional data regarding the throat area of the selected throat.

The present invention in one aspect advantageously improves the accuracy and robustness of measurement by providing a more steady and homogenous lighting reflection to be measured, which improves contrast and reduces light saturation of the light sensors. In another aspect, the accuracy of the throat area measurement is improved by minimizing secondary shadow cast in the area of reflection surrounding the area of shadow corresponding to the throat area of the selected throat being measured. These advantages and other features of the present invention will be better understood with reference to the preferred embodiments described hereinafter.

BRIEF DESCRIPTION OF THE DRAWINGS

Reference will now be made to the accompanying drawings showing by way of illustration preferred embodiments, in which.

DETAILED DESCRIPTION OF THE PREFERRED EMBODIMENT

A method and a device for measuring the throat area of a vane ring for gas turbine engines is described in the applicant's co-pending U.S. patent application Ser. No. 10/270,506, which is incorporated herein by reference.

Figure 1:
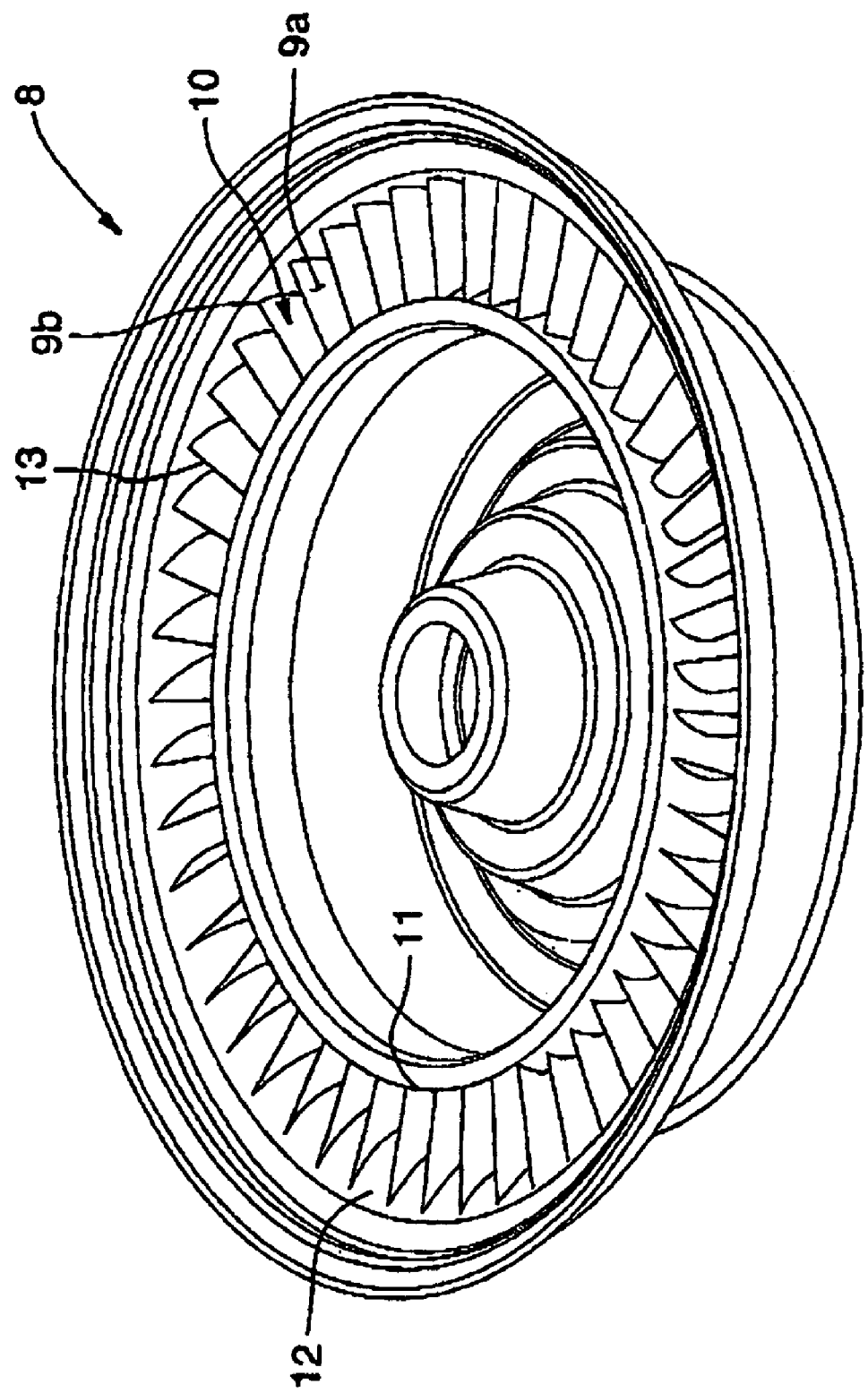
FIG. 1 is a perspective view of a single vane ring showing the trailing edges of an array of stator vanes confined between an inner and outer shroud.
Figure 2:
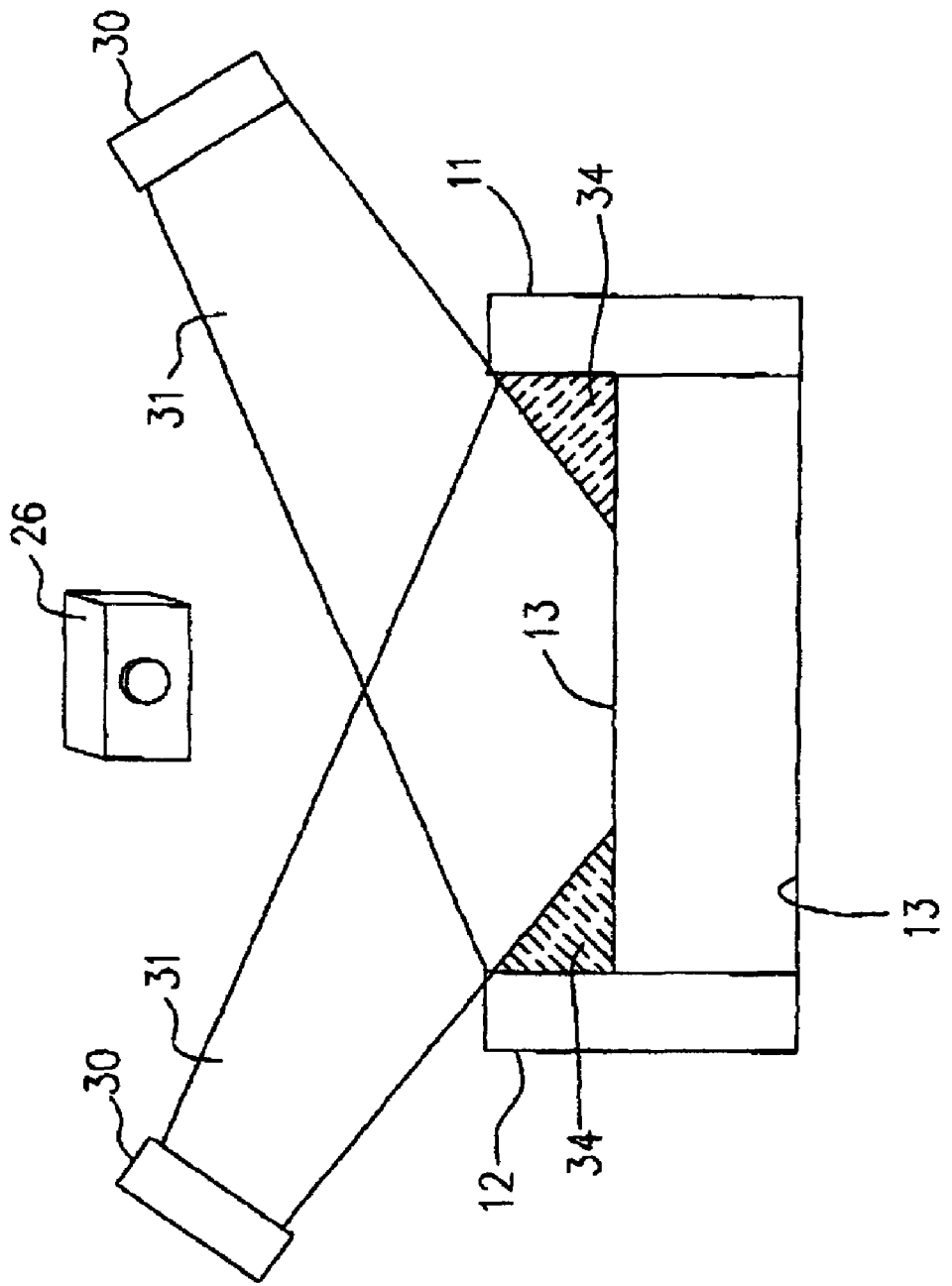
FIG. 2 is a schematic view illustrating a vane throat measurement device according to a prior art measurement technique.

Referring to FIGS. 1 and 2, a vane ring 8 has an annular array of stator vanes 9a and 9b which define a plurality of individual throats 10 therebetween. Each throat 10 is an opening bounded by a inner vane shroud 11, an outer vane shroud 12, the trailing edge 13 of the leading vane 9a, and a line 14 (See FIG. 3) projected onto the convex surface of the adjacent or following vane 9b. The shrouds 11 and 12 extend above the trailing edge 13 and the throat 10 so as to obscure a view of the latter from some perspective angles. A plurality of light or other radiation sources 30 light the vane ring 8 in a suitable manner, and a camera 26 or other sensor is provided to capture an image of reflected radiation. The method of operation of this device is described in more detail in the incorporated reference, applicant's co-pending application Ser. No. 10/270,506, and thus need not be discussed further here.

Referring still to FIGS. 1 and 2, the vanes 9a and 9b defining the throat area can be positioned relatively deeply relative to the shrouds 11, 12, and thus secondary shadows 34 tend to be cast by the radially outwardly extending peripheral portion of the shrouds 11, 12, as illustrated in FIG. 2. These secondary shadows 34 tend to dilute the contrast between the areas of reflection and the areas of shadow, thereby creating errors during an image analyzing process conducted by a processor 37.

The problem of secondary shadows can be addressed in part by having a low angle of incidence between the light and the vane ring as shown in FIG. 2, so that the secondary shadows are not cast by the shrouds. However, low incidence angles detrimentally decrease the amount of light that is reflected back towards the camera 26, it being understood, with reference to FIG. 2, that the camera 26 is placed roughly perpendicularly relative to the trailing edge and therefore light having a high angle of incidence (i.e. striking the trailing edge more perpendicularly) would permit more light to be reflected in the direction of the camera 26. This means that some hard-to-light areas of the vane ring, such as the shroud areas, do not reflect as well as other easier-to-light areas, such as the vane trailing edges.

The problem of low incidence angle lighting could be compensated for by increasing the light intensity, however, increasing light intensity will also tend to increase reflectance from the easier-to-light (and therefore typically brighter) areas of the vane ring, such as the trailing edges. Therefore, when an electronic light sensor is used, such as a digital camera, increasing the light intensity also tends causes a larger than desired reflectance from the easier-to-light areas of the vane ring, which can overload the light sensing device in the sensor (e.g. in a digital camera, the charge-coupled devices or CCDs). This results in an effect called "blooming" in which the overloaded sensor mishandles the light data the resultant image has light "bleeding" into adjacent areas of dark, thereby causing a distortion of the resultant image. Over-lighting thus tends to distort the light/dark boundary delineating the throat 10 of the vane ring 8, and therefore leads to inaccuracies in measurement, and particularly so if the vane ring has a highly reflective or polished finish.

Figure 3:
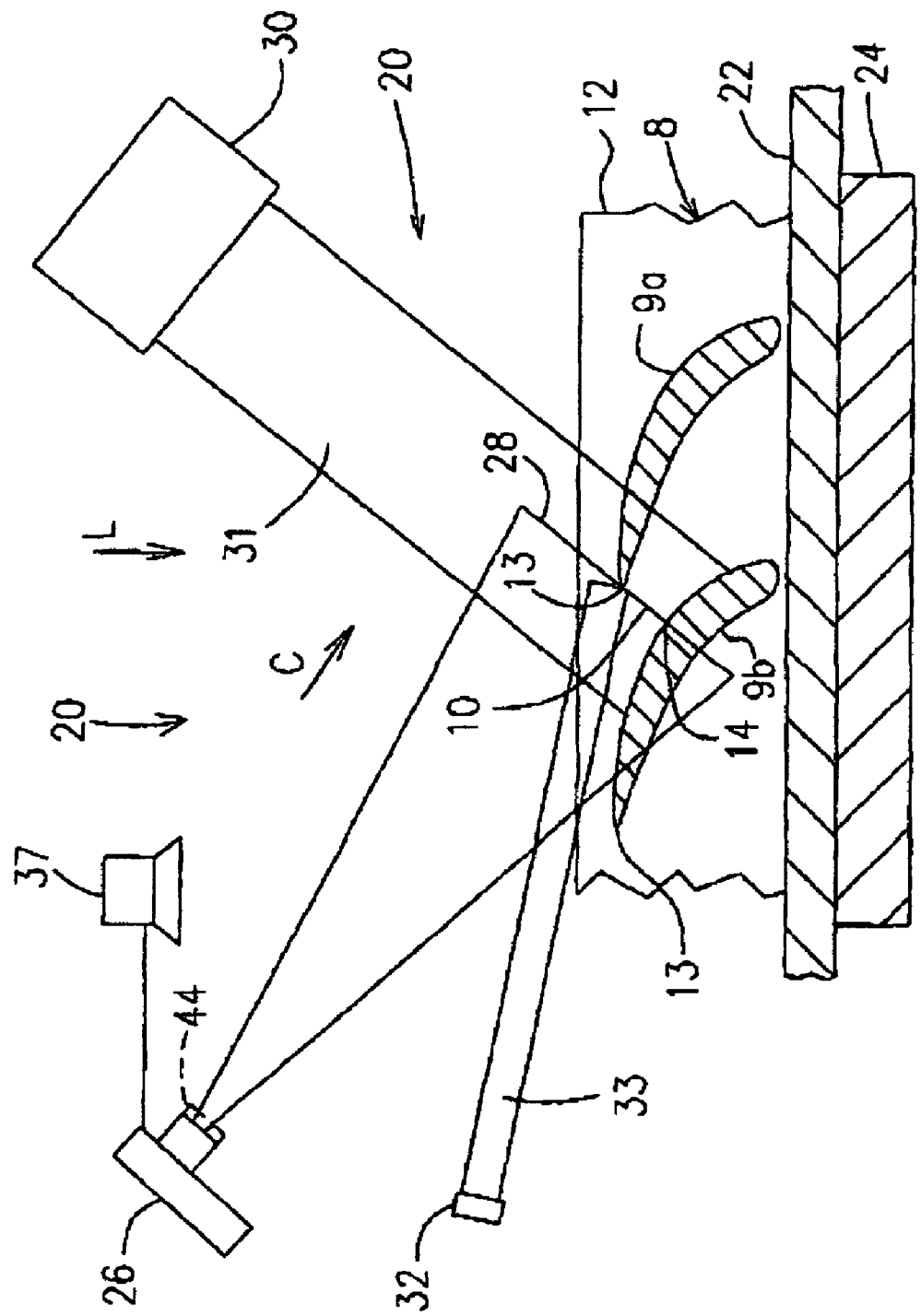
FIG. 3 is a schematic elevational sectional view of a device according to one embodiment of the present invention.

FIG. 3 illustrates a device 20 according to the present invention which addresses this and other problems. Device 20 includes a fixture 22 preferably with a rotary indexing table 24 so that the vane ring 8 can be progressively rotated about its axis to permit a light detector 26, for example a camera, to capture images of each throat and then permit a processor 37 to analyze the data to acquire dimensional data on the total throat area for the entire ring 8.

The vane ring 8 is placed in the fixture 22 in an imaging position such that the periphery of a selected individual throat 10 is within an optical measuring field of view 28 of camera 26. The device 20 further includes a plurality of primary lighting sources 30 (see also FIG. 4), which are positioned in a throat-defining position in order to cast light (represented by area 31) such that an area of shadow is cast on the vane ring 8 in a desired manner to highlight the selected throat 10. The area of shadow is preferably closely surrounded by and contrasted with an area of reflection where the light is reflected by the vane ring 8, thereby delineating the throat area. An auxiliary lighting source 32 is preferably positioned to cast light (indicated by area 33) illuminate the trailing edge of the leading vane 9a.

Referring still to FIG. 3, the viewing direction of the camera 26 (indicated as arrow C) is preferably substantially perpendicular to the field of view 28 of the selected throat 10 to maximize accuracy and ease of measure. The preferred viewing direction C is thus from slightly above perpendicular, in order to more precisely define the lower boundary of the shadow which is defined on the convex surface of the following vane 9b. With the vane ring 8 positioned in the fixture 22 in the imaging position, shown with the periphery of the individual throat 10 within the measuring field of view 28, the camera 26 can proceed to capture an image of a portion of the vane ring 8 within the field of view 28, with the camera 26 or other radiation detector to suit the lighting sources 30 and 32.

In use, the image captured by the camera 26 is processed by processor 37 which analyzes the image to calculate and acquire the dimensional data of the selected throat 10. The processor 37 preferably also sums the measured data to acquire the dimensional data of a total throat area 10 of the vane ring 8. In order to progressively capture the image of each throat 10 of the vane ring 8, the vane ring 8 held in the fixture 22 is rotated with the rotary indexing table 24 from one position to another.

Figure 4:
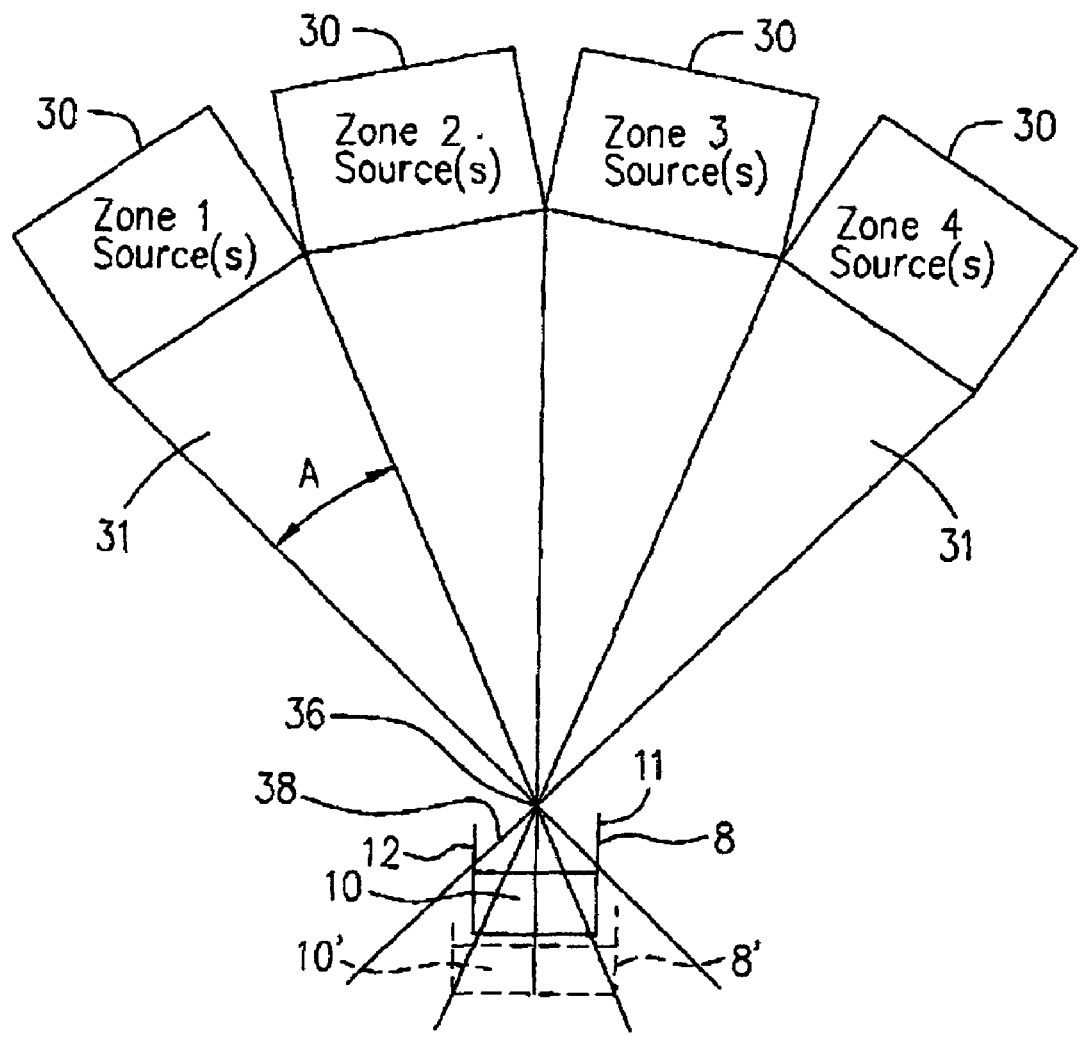
FIG. 4 is a schematic view of the device in an direction indicated by arrow C in FIG. 3.
Figure 4A:
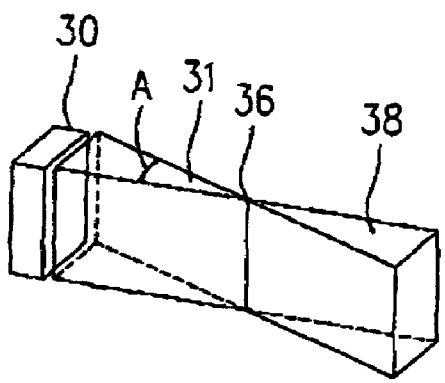
FIG. 4A is an isometric view of a single light source according to an aspect the invention.

The primary lighting sources 30 and auxiliary lighting source(s) 32 are typically collimated to provide sharp definition to the light/shadow boundaries. However, in order to address the described problems associated with low incidence angle lighting and blooming, in one embodiment of the present invention best illustrated in FIG. 4, the invention includes a plurality of primary lighting sources 30 (four in this embodiment) which are positioned adjacent one another and angled with respect to each other, as will be described further below. Each of the primary lighting sources 30 radiates a beam which is substantially focused in one plane and substantially collimated in another plane, as shown in FIG. 4A. (For convenience of illustration, light is represented as a solid in FIG. 3b.) Thus, each beam is preferably prismatic Further, the light beams are preferably all focused to coincide along an single axis, which thereby creates, in effect, a virtual light source 36 which is a line source. The combined effect is that light thus apparently radiates from the virtual light line source 36 and has a plurality of zones 38 which may be cast upon a selected region of the vane ring 8, as desired, as shown in FIG. 4. Each lighting zone 38 of course corresponds to, and may therefore be independently controlled through, one of the primary lighting sources 30. That is, the intensity of the primary lighting sources 30 is preferably adjustable, for example by the operator, or more preferably by a computer based on feedback received from the camera or other sensor(s) or in any other suitable manner, to permit the intensity of zones 38 to vary according to preference.

As is illustrated in FIG. 4, the respective radiating zones 38 are adjacent to each other but preferably have little or no overlap or gap between adjacent zones 38, to minimize unwanted increase or decrease in intensity around the perimeter of the throat 10. The virtual lighting source 36 is preferably located in a close relationship relative to the selected throat 10 so that light can be radiated on the region of the vane ring 8 without substantial secondary shadow being cast by either one of shrouds 11, 12, such that all surfaces surrounding the throat opening of the vane ring 8 are illuminated adequately. Preferably, the distance between the virtual primary lighting source 36 and the selected throat 10 of the vane ring 8 may be adjusted depending on the size of the vane ring 8 and the selected throat 10. A larger vane ring 8' having a selected throat 10' (shown in broken lines in FIG. 4) may require a greater distance between the virtual primary lighting source 36 and the selected throat 10' of the vane ring 8' for adequate lighting, for example. Adjustment of the position of the virtual source location relative to the subject vane ring may be achieved by moving the vane ring relative to the virtual source (preferred), repositioning the direction of lighting sources 30, and/or through the use of a moveable lens system as described below with reference to FIG. 8.

The individual primary lighting sources 30 are preferably controlled independently, such that the intensity of each lighting zone 38 can be individually adjusted (automatically or manually, as desired) and the beam focusing angles "A" of the respective primary sources 30, may adjusted. The angles A may be equal, as shown in FIG. 4, or may be different, as shown in FIG. 5, depending on the benefits which may be presented when lighting a particular subject.

Figure 5:
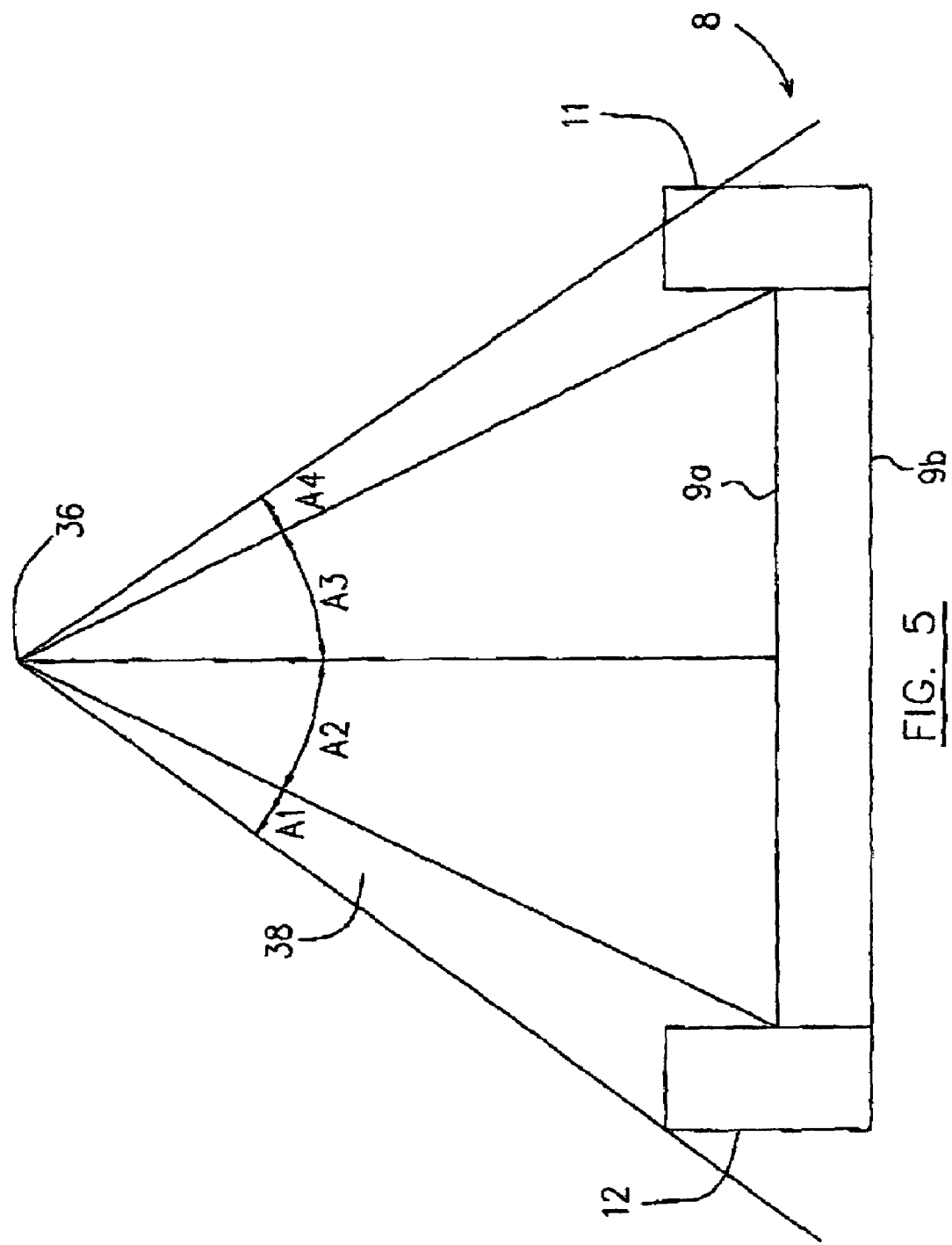
FIG. 5 is an enlarged partial view of FIG. 4, showing the adjustment of lighting zones.

FIG. 5 illustrates an example of an adjustment of the intensity of individual lighting zones for better delineating the throat area 10. The surfaces surrounding the throat opening are typically disposed at different distances away from the virtual primary lighting source 36 because of the geometry of the vane ring 8 to be lighted. The surfaces around the throat opening may also be different with respect to light reflectance, perhaps because of different materials and surface conditions of such parts, light reflection angles, etc. The virtual primary lighting source 36 provides lighting zones 38 which can be advantageously adjusted in light intensity. Therefore, it may be preferable to arrange a virtual primary lighting source 36 having wider inner lighting zones (having angles $A_2$ and $A_3$) which substantially light the vanes 9a and 9b, and narrower outer lighting zones (having angles $A_1$ and $A_4$) which substantially light the inner and outer shrouds 11 and 12. The intensity and size of these inner and outer lighting zones 38 can preferably be adjusted according to the light reflecting features of the respective shrouds 11, 12 and vanes 9a and 9b. Thus, the region for the selected throat 10 can be lighted in a manner to substantially avoid casting secondary shadow while causing no significant blooming problem. It is to be understood that the "zones" discussed are conceptual in nature and, in practice, they may be any size and number, and may also be provided by a common light or other radiation source having variable intensity "subzones".

Figure 6:
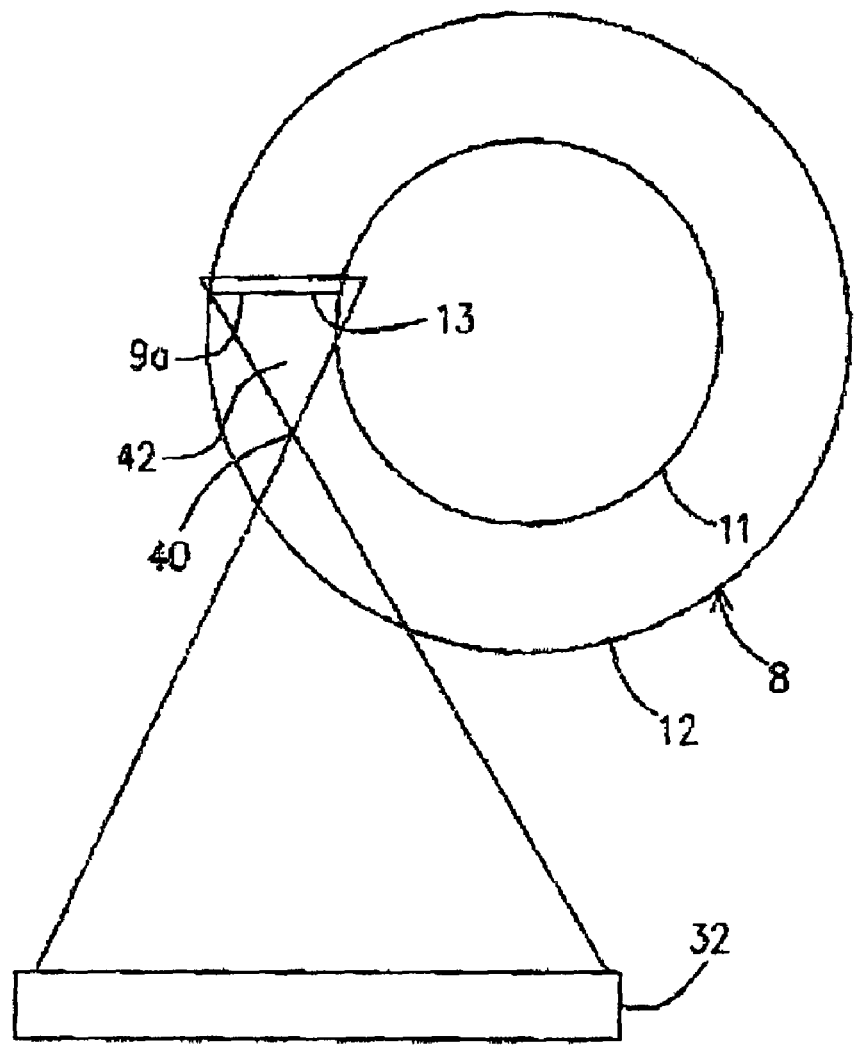
FIG. 6 is a schematic view of the device in the longitudinal direction of the vane ring, as indicated by arrow L in FIG. 3.

Referring to FIGS. 3 and 6, as mentioned an auxiliary lighting source 32 may be used to light the vane trailing edge 13 while avoiding illumination of the inside of the vane throat opening. The beam from the auxiliary lighting source 32 is projected at a low incidence angle (as shown in FIG. 3), preferably just above the outer shroud 12 and about 10° to 15° above the horizontal line, in order to avoid the secondary shadow problem caused by the outer shroud 12. Similar to the primary lighting source 30, the auxiliary lighting source 32 is preferably radiates a beam collimated in one plane (see FIG. 3) and focused in another plane (see FIG. 6). The beam from the auxiliary lighting source 32 is thus also prismatic and focused on a straight line to thereby provide a virtual auxiliary lighting source 40, which is in a close relationship to the trailing edge 13 of the vane 9a. The resultant auxiliary lighting zone 42 is thus preferably sized and shaped for just lighting the trailing edge 13 of the vane 9a. Use of the auxiliary lighting source 32 is optional, and may not add any improvement at all depending on how the primary lighting sources 30 are used in accordance with the present invention.

Figure 7A:
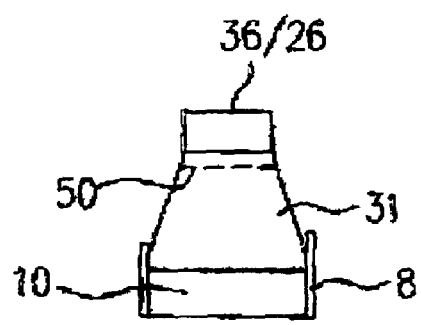
FIG. 7A is a schematic view, similar to FIG. 4, of an alternate embodiment of the present invention.
Figure 7B:
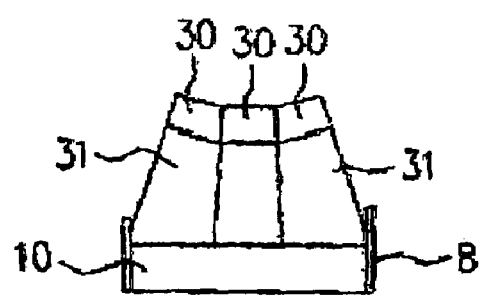
FIG. 7B is a schematic view, similar to FIG. 4, of an alternate embodiment of the present invention.

In an alternate arrangement shown in FIG. 7A, one combined primary lighting source 36 and camera/sensor 26 is positioned in a close relationship relative to the selected throat 10, such as the location of the virtual primary lighting source 36, in order to radiate light on a region of the vane ring 8 covering the area of shadow and the area of reflection, thereby avoiding secondary shadow cast in the area of reflection resulting from inadequately radiating the area of reflection. In other words, the virtual lighting source 36 can be replaced by at least one physical lighting source positioned in the same location. To avoid interference, the light source and camera/sensor may be in effect combined (e.g. through the use of fibre optics), so that the presence of one does not interfere with the operation of the other). Similarly, the "single" source 30 may be, in fact, a source 30 comprising a single bundle of a plurality of fibre-optically delivered light sources, to thus provide a sort of hybrid between this and previously-described embodiments. The single source may be further improved by the optional addition of a filter 50 (shown as a broken line) on the light that allows the effective intensity of the light to be varied as a function of the location of the portion of the surface being illuminated (e.g. dimmer in the centre and brighter towards the outer shroud areas). This permits a net effect similar to the multiple source solution presented above. In another configuration, shown in FIG. 7B, a plurality of primary lighting sources providing respective radiating zones have relatively small sizes and thus can be positioned closely to the throat so that they are illuminating to adequately without substantial secondary shadow to thereby radiate light generally evenly on a region of the vane ring 8. The intensity of the respective radiating zones are preferably independently adjustable. The camera/sensor 26 (not shown in FIG. 7B) could be separate or made integral with (e.g. by fibre optics) the lighting arrangement.

In another embodiment of the present invention, the camera 26 may include a polarizing filter 44 (see FIG. 3) such that the intensity of polarized reflected light being received by the camera 26 is reduced, which is preferably done to reduce the occurrence of blooming. This technique may be employed with lighting techniques according to the present invention, or when conventional lighting sources are employed.

In accordance with another embodiment of the present invention (not shown), a coating material is selectively applied to the vane ring 8 to selectively reduce the intensity of reflectance the vane ring 8 around the perimeter of throat 10. With such a coating material on the vane ring 8, the intensity of the light from both the primary and auxiliary lighting sources 30 and 32, can be selectively decreased at desired locations to minimize blooming problems, even when conventional lighting sources are employed. For example, areas of problematically high reflectance (e.g. the trailing edge) can be preferentially coated with such powder to reduce the reflectance of this area and thereby achieve a more uniform reflectance of the subject to be measured. (Conversely, a coating may be use to enhance the reflectance of the subjects that typically have a lower reflectance). The method of measuring the throat area in such a vane ring with the coating material thereon is otherwise similar to other embodiments as above described.

In general, both the primary and auxiliary lighting sources 30 and 32 for the above-described embodiments can be alternatively replaced by any suitable radiation sources radiating other than visible light, such as infrared or ultraviolet.

Figure 8:
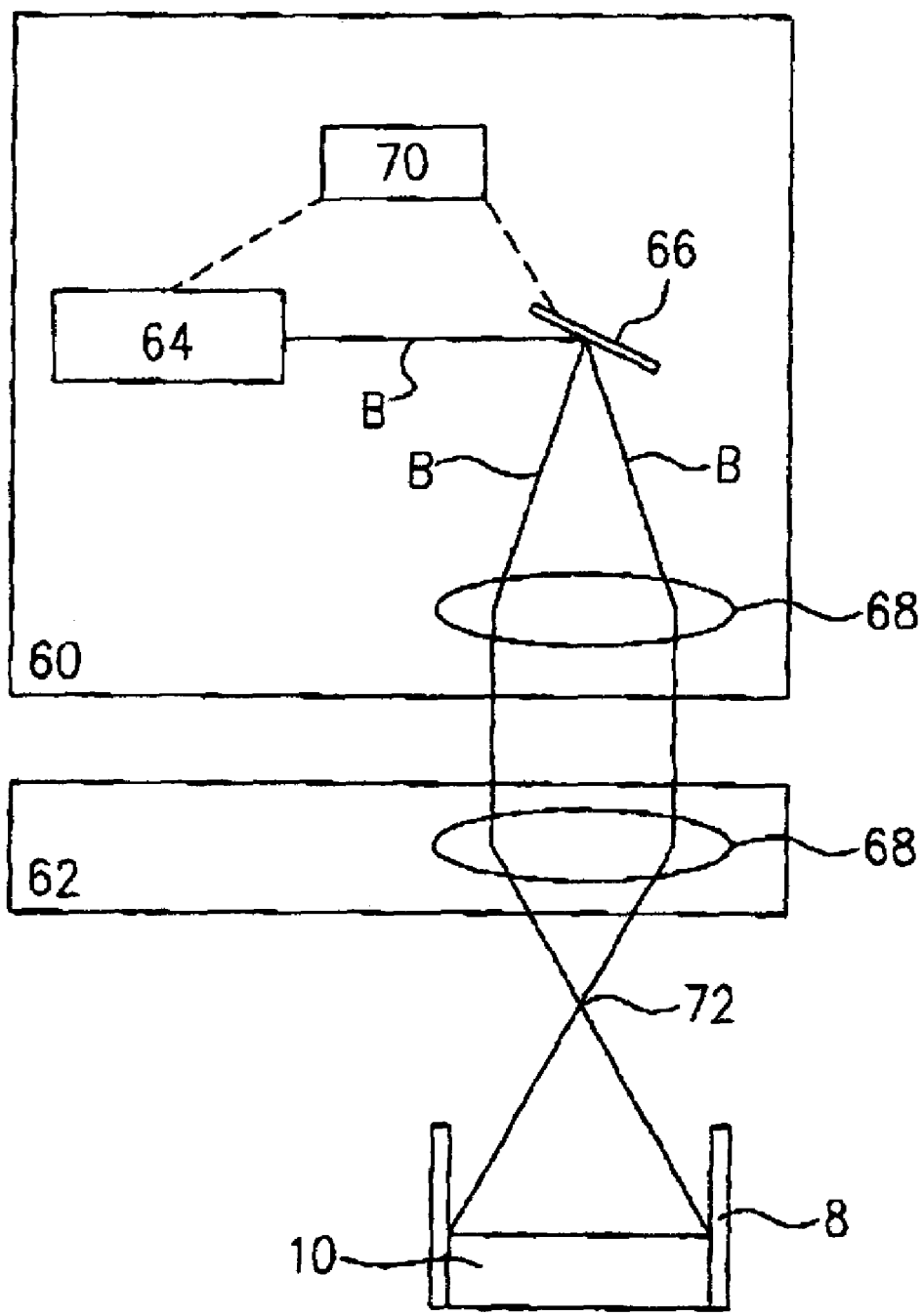
FIG. 8 is a schematic view of a further embodiment of the present invention, similar to that of FIG. 4.

A laser may also be used, as shown in FIG. 8. A laser projection apparatus 60 and a moveable lens apparatus 62 is provided. The laser projection apparatus 60 comprises a suitable laser assembly 64 for projecting preferably a single laser beam B onto a rotatable mirror 66, such as a galvanometer mirror or other moveable reflecting device, for reflection through a lens 68. The mirror and lens permit the laser beam B to be 'steered' into a variety of directions which result in a variable trajectory for the beam B (two examples of which are depicted in FIG. 8). A controller 70 permits control of the mirror angle. Moveable lens apparatus 62 comprises a second lens 68 for redirecting the leaser beam B towards the subject throat 10 of the vane ring 8. As the mirror 66 angle is changed, lenses 68 co-operate to direct the laser beam always through a virtual source 72, the location of which may be varied by movement of lens apparatus 62. As with previous embodiments, movement of the virtual source 72 might be desired, for example, to permit proper setup of a particular vane arrangement (i.e. the desired distance between the vane ring 8 and the virtual source 72 may vary from one vane ring configuration to the next depending, for example, on the height of the shrouds relative to the width between the shrouds). In use, the controller 72 adjusts mirror 66 to direct laser beam B to trace an outline of the throat 10, which outline may be captured by camera 26 (not shown) in a similar manner as described above for analysis and determination of throat area. in contrast to previous embodiments, in this approach the an image of the throat area is captured through a sequential capture of the boundary as traced by the laser, rather than the entire boundary being captured at once as before. By providing the virtual source 72, secondary shadow is avoided. In a further embodiment, controller 72 may also control the intensity of the laser 64 so that beam B may have variable intensity as the throat perimeter is traced, as, desired.

Modifications and improvements to the above-described embodiments of the present invention may become apparent to those skilled in the art. For example, multiple cameras 26 may be employed, in which each camera 26 may measure a defined portion of the throat area, the results of which are then summed to obtain a total. Alternately, each camera may be used to measure the entire throat and results then averaged to improve accuracy. Though the terms 'light' and 'camera' pervade this description and claims, it will be understood that this in intended to encompass any suitable radiation source(s) and detecting device(s) that may be used, and that a single type need not be relied upon, but combinations thereof may also be employed. Although CCD technology has been discussed, other sensors may employ light sensitive devices such as charge injection devices (CIDs) of complementary metal oxide semiconductor (CMOS) sensors, and the present invention is not intended to be limited to the use of a particular sensing technology. The skilled reader will understand that the laser "tracing" technique may also be employed with other types of light, as well. The foregoing description is intended to be exemplary rather than limiting. The scope of the present invention is therefore intended to be limited solely by the scope of the appended claims.

We claim:

1. A device for measuring a throat area in a vane ring for gas turbine engines, the vane ring having an annular array of vanes defining a plurality of individual throats between adjacent leading and following vanes of the array, the device comprising:

at least one primary lighting source adapted to radiate light onto a vane ring in a manner to provide an area of reflectance surrounding an area of primary shadow, the area of primary shadow substantially corresponding to an area of a selected throat to be measured, the at least one primary lighting source being positioned sufficiently close to the vane ring such that the at least one lighting source provides the area of reflectance substantially without secondary shadow, said secondary shadow being caused by interruption of light from the at least one primary source by a portion of the vane ring;

a detector positioned for capturing data regarding said area of reflectance and said area of primary shadow; and a processor for analyzing the data to determine dimensional data regarding the area of the selected throat.

2. The device as claimed in claim 1 wherein the at least one primary lighting source is a virtual source created by a focused light beam from at least one real lighting source spaced apart from said virtual source.

3. The device as claimed in claim 2 wherein the at least one real source comprises a plurality of real light sources, and the plurality of Sources provide light which is focused along a common axis, said axis providing the virtual source.

4. The device as claimed in claim 3 wherein the plurality of real sources are arranged to radiate without substantial overlaps or gaps between adjacent zones in which they respectively radiate.

5. The device as claimed in claim 3 wherein the intensity of the real sources is independently adjustable.

6. The device as claimed in claim 3 wherein the real sources radiate light which is focused in one plane and collimated in another plane.

7. The device as claimed in claim 1 wherein the at least one primary lighting source radiates radiation of a type selected from the group comprising: visible light, infrared light, ultraviolet light and laser light.

8. The device as claimed in claim 1 wherein the at least one primary lighting source comprises at least one fibre optic source.

9. The device as claimed in claim 1 wherein the at least one primary lighting source includes a filter member adapted to selectively reduce light emitted from the source across a portion of a zone lit by the source.

10. A device for measuring a throat area in a vane ring for gas turbine engines, the vane ring having an annular array of vanes defining a plurality of individual throats between adjacent leading and following vanes of the array, the device comprising:
- a plurality of primary lighting sources adapted to radiate light onto a vane ring in a manner to provide an area of reflectance surrounding an area of primary shadow, the primary shadow substantially corresponding to an area of a selected throat to be measured, the plurality of primary lighting sources providing adjacent radiating zones of light without substantial overlap or gap between said adjacent zones;
- a detector positioned for capturing data regarding said areas of reflectance and primary shadow; and
- a processor for analyzing the data regarding said areas to determine dimensional data regarding the area of the selected throat.

11. The device as claimed in claim 10 wherein the intensity of light in the radiating zones is independently adjustable from one another.

12. The device as claimed in claim 10 wherein the primary lighting sources are focused along a common axis to thereby provide virtual lighting source between the selected throat and the primary lighting sources.

13. A device for measuring a throat area in a vane ring for gas turbine engines, the vane ring having an annular array of vanes defining a plurality of individual throats between adjacent leading and following vanes of the array, the device comprising:
- at least one primary lighting source adapted to radiate light onto a vane ring in a manner to provide an area of reflectance surrounding an area of primary shadow, the area of primary shadow substantially corresponding to an area of a selected throat to be measured, the at least one primary source providing a light beam focused to provide an effective virtual lighting source located between the primary lighting source and the selected throat;
- a detector positioned for capturing data regarding said areas of reflectance and primary shadow; and
- a processor for analyzing data to determine dimensional data regarding the area of the selected throat.

14. The device as claimed in claim 13 wherein a plurality of primary lighting sources are provided and said sources are focused along a common axis to thereby provide the virtual lighting source.

15. The device as claimed in claim 14 wherein the primary lighting sources are positioned to radiate light in a plurality of radiating zones, said radiating zones being substantially free from areas of overlap with one another.

16. The device as claimed in claim 14 wherein the primary lighting sources are individually controllable to adjust at least one of the intensity, position and focus thereof.

17. The device as claimed in claim 13 wherein the at least one primary lighting source radiates radiation of a type selected from the group comprising: visible light, infrared light, ultraviolet light and laser light.

18. A device for measuring a throat area in a vane ring for gas turbine engines, the vane ring having an annular array of vanes defining a plurality of individual throats between adjacent leading and following vanes of the array, the device comprising:
- at least one primary lighting source adapted to radiate light onto a vane ring in a manner to provide an area of reflectance surrounding an area of primary shadow, the area of primary shadow substantially corresponding to an area of a selected throat to be measured;
- a detector positioned for capturing data regarding of said areas of reflectance and shadow;
- a polarizing filter co-operating with the detector to filter said data; and
- a processor for analyzing the data to determine dimensional data regarding the area of the selected throat.

19. A method of measuring a throat area in a vane ring for gas turbine engines, the vane ring having an annular array of vanes defining a plurality of individual throats between adjacent leading and following vanes of the array, the method comprising:
- directing light towards a selected throat of the vane ring to provide at least one area of reflectance and at least one area of primary shadow, said areas being proportional to a throat area of the selected throat;
- selectively varying the intensity of reflected light across the area of reflectance to permit more uniform reflectance data to be received from the area of reflectance;
- acquiring reflectance data from the area of reflectance; and
- analyzing the data to determine dimensional data regarding the throat area of the selected throat.

20. The method of claim 19 wherein the step of selectively varying the intensity of reflected light is achieved using at lest one of the steps of the group comprising:
- selectively varying an intensity of a portion of the light directed towards the selected throat;
- filtering the reflected light received form the area of reflectance; and
- applying a coating to at least a portion of the vane ring around the selected throat to alter an intensity of reflectance from said portion.

* * * * *